(No Model.)
F. X. CARON.
WEAVER'S MEASURING DEVICE.
No. 523,759. Patented July 31, 1894.
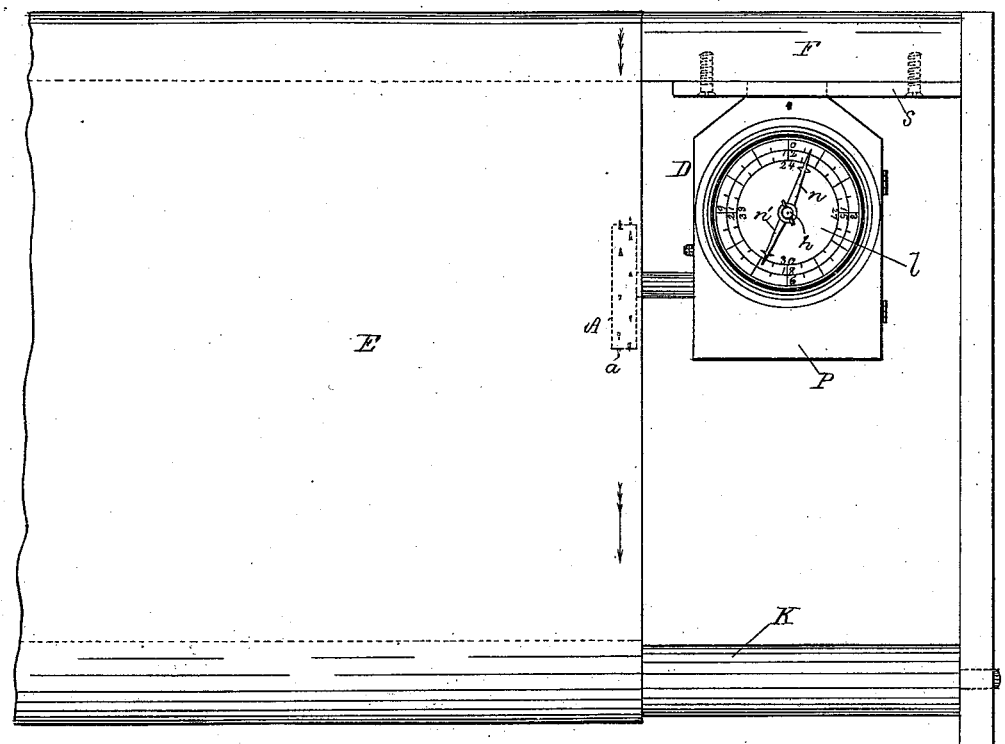
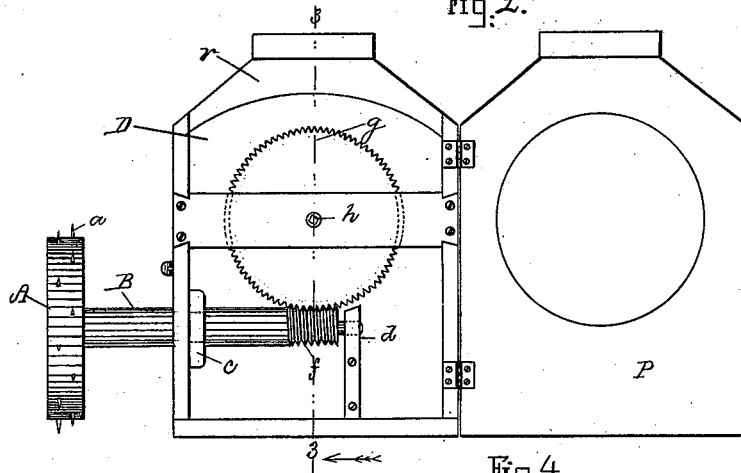
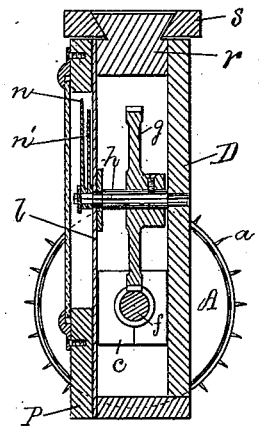
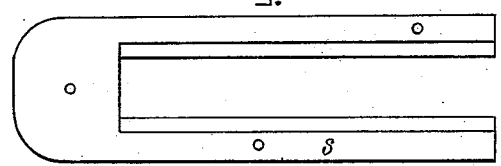
Witnesses.
Laurits W. O. Köller.
Anna B. Hammerich.
Inventor.
Francois Xavier Caron
by W. A. Copeland
his atty.

UNITED STATES PATENT OFFICE.

FRANÇOIS XAVIER CARON, OF METHUEN, MASSACHUSETTS.

WEAVER'S MEASURING DEVICE.

SPECIFICATION forming part of Letters Patent No. 523,759, dated July 31, 1894.

Application filed May 20, 1893. Serial No. 474,867. (No model.)

*To all whom it may concern:*

Be it known that I, FRANÇOIS XAVIER CARON, a citizen of the United States, residing at Methuen, in the county of Essex and Commonwealth of Massachusetts, have invented a new and useful Weaver's Measuring and Indicating Device for Measuring and Indicating the Amount of Cloth Woven, of which the following is a specification, reference being had to the accompanying drawings.

The object of my invention is to provide a simple, cheap device which a weaver can readily attach to his loom to measure and indicate at a glance the length of cloth woven.

My invention consists in a wheel or drum having on its periphery a friction surface over which the cloth passes as it runs from the loom causing the drum to revolve, the drum being mounted on a shaft connected with mechanism which operates the indicator device to be particularly described hereinafter, and the whole combined with certain devices by which it may be readily attached to and detached from the loom as will be more particularly described and claimed hereinafter.

In the drawings, Figure 1 is a front elevation of my device in operation. Fig. 2 is a front elevation with door open and dial removed to show the interior mechanism. Fig. 3 is a vertical section on line 3 3 of Fig. 2 when the door is closed. Fig. 4 is a top view of the fork from which the box is suspended.

A is a wheel or drum fixed on the end of a shaft B and having arranged around its periphery a series of points $a$. For cheapness of construction, the wheel is preferably made of wood and the points may be short pins thrust through a cloth or leather band which is bound around the periphery like a tire. The shaft B is journaled in suitable bearings $c$ $d$ in the box D, and has formed near its inner end a screw thread $f$ which engages with a worm-wheel $g$. This worm-wheel $g$ has an axle or shaft $h$ which passes through the middle of the dial $l$ fixed on the front of the box. On the outer end of the axle $h$ are two index hands $n$ $n'$. The dial is shown with three concentric rings, each divided into twelve sections and numbered consecutively.

D is a door with glass window in front of the dial.

The box should be set in such position that when the cloth E runs down off the breast beam F onto the cloth beam K it will run past the wheel A and be caught by the points $a$, thus revolving the wheel and its shaft B, and therefore the worm-wheel $g$ and the index hands $n$ $n'$. The wheel A and the screw $f$ and worm-wheel $g$ should be so proportioned as to move the index hand through a predetermined distance on the dial for each yard of cloth.

In order to have the box small enough for convenience, and yet avoid complicated gearing, I prefer to so adjust the parts that the hands will make one revolution for every twelve yards. As there are rarely over thirty-six yards in a piece, I have shown but three circles. The weaver can tell easily by the size of the piece run off whether the hand is on its first, second or third round. For instance if the hand points toward 3, 15 and 27, it means that the number of yards woven is either three, fifteen or twenty-seven, and the weaver can tell which it is by the size of the piece. By gearing differently, the full thirty-six yards may be measured at one revolution, and only one circle will be required.

A workman will seldom weave over eight or ten yards a day, and I use two index hands to indicate the last day's work and register the total. For instance, when a new piece is started I set both hands at 0. Both hands will move together. If six yards are run off during the day, both hands will point to 6 at night. The next morning I leave the short hand still pointing at 6 and move the long hand back to 0. If nine yards more are run off during the second day, at night the long hand will point to 9 and the short hand will have moved around past the 12 and point toward the 3, 15 and 27 to indicate the total. The workman can tell from the size of the roll as well as from memory that it means fifteen and not three or twenty-seven.

The best place to hang the device is to suspend it from the breast-beam so that the drum A will be near the outer edge of the cloth. The device which I have shown for suspending it is a dovetail block $r$ on the top of the box dovetailed in a fork $s$ screwed to the under side of the breast beam. The block $r$ fits loosely in the fork so as to slide readily in order both that it may be taken off at night and carried away by the workman, and also that it may be adjusted to different positions in the fork to suit different widths of cloth.

There are many ways by which a suitable friction surface may be made on the drum A without departing from the spirit of my invention, but I think the points are the best. Also the intermediate gearing may be varied by any skillful mechanic, the main object being to cause the index hand to move through a predetermined arc for each unit of fabric that passes over the drum.

What I claim as my invention is—

1. A portable, detachable cloth measuring and indicating device consisting of a drum having a friction surface on its periphery and adapted to be rotated by the moving fabric as it passes from the loom, a shaft on which the drum is mounted journaled in a box D, a worm formed on that portion of the shaft within the box, and a pinion wheel rotated thereby, an axle for the pinion wheel mounted in suitable bearings in the box, two index hands carried on said axle, rotating uniformly with said axle and with each other, the gearing being so proportioned that each index hand will move through a pre-determined arc for each rotation of the drum, a dial with a series of concentric circles each graduated into divisions so numbered that the numbers will run consecutively from one circle onto another at the same rate of increment on each circle, the hands being capable of independent adjustment in either direction at any time so that one hand may be allowed to move continuously forward and indicate the total number of units measured up to the limit of the dial or less, as desired, while the other hand may be moved back to zero at any time and will indicate the number measured since the last preceding adjustment, substantially as described.

2. A portable, detachable cloth measuring and indicating device consisting of a drum having a friction surface on its periphery and adapted to be rotated by the moving fabric as it passes from the loom, a shaft on which the drum is mounted journaled in a box D, a worm formed on that portion of the shaft within the box, and a pinion wheel rotated thereby, an axle for the pinion wheel mounted in suitable bearings in the box, two index hands carried on said axle rotating uniformly with said axle and with each other, the gearing being so proportioned that each index hand will move through a predetermined arc for each rotation of the drum, a dial with a series of concentric circles each graduated into divisions so numbered that the numbers will run consecutively from one circle onto another at the same rate of increment on each circle, the hands being capable of independent adjustment in either direction at any time so that one hand may be allowed to move continuously forward and indicate the total number of units measured up to the limit of the dial or less, as desired, while the other hand may be moved back to zero at any time and will indicate the number measured since the last preceding adjustment, a dove-tailed block on the top of the box and a fork with which the dove-tailed block is adapted to be readily engaged and disengaged as well as adjusted to different positions, the fork also being adapted to be readily attached to and detached from the loom, substantially as described.

FRANÇOIS XAVIER CARON.

Witnesses:
J. C. ATKINSEN,
WM. A. COPELAND.